United States Patent [19]
Grgach et al.

[11] 3,939,033
[45] Feb. 17, 1976

[54] ULTRASONIC WELDING AND CUTTING APPARATUS

[75] Inventors: Frank J. Grgach, Danbury; Everett A. Harris, Ridgefield, both of Conn.

[73] Assignee: Branson Ultrasonics Corporation, New Canaan, Conn.

[22] Filed: Dec. 16, 1974

[21] Appl. No.: 532,847

[52] U.S. Cl. ..................... 156/515; 156/580; 228/1
[51] Int. Cl.² ..................... B06B 3/00; B29C 27/08
[58] Field of Search ................. 156/580, 73.1–73.4, 156/515, 251; 228/1, 110; 264/23; 425/174.2

[56] References Cited
UNITED STATES PATENTS

| | | | |
|---|---|---|---|
| 2,262,493 | 11/1941 | Guinzburg | 156/145 |
| 3,113,225 | 12/1963 | Kleesattel et al. | 226/196 |
| 3,419,447 | 12/1968 | Hewitt | 156/580 |
| 3,562,041 | 2/1971 | Robertson | 156/580 X |
| 3,733,238 | 5/1973 | Long et al. | 156/580 |
| 3,749,626 | 7/1973 | Buck | 156/251 |

Primary Examiner—William A. Powell
Assistant Examiner—M. G. Wityshyn
Attorney, Agent, or Firm—Ervin B. Steinberg; Philip J. Feig

[57] ABSTRACT

An ultrasonic welding and cutting apparatus designed for the manufacture of articles made of two superposed sheet materials includes an anvil means which exhibits a raised pattern of welding and cutting surfaces, and bearing surface means for limiting the motion of an ultrasonically vibrating horn toward the anvil means and for distributing also the impact forces manifest upon the anvil means. The horn is provided with means for reducing the motional excursion of the frontal surface portion which impacts upon the bearing surface means.

18 Claims, 9 Drawing Figures

FIG. 3

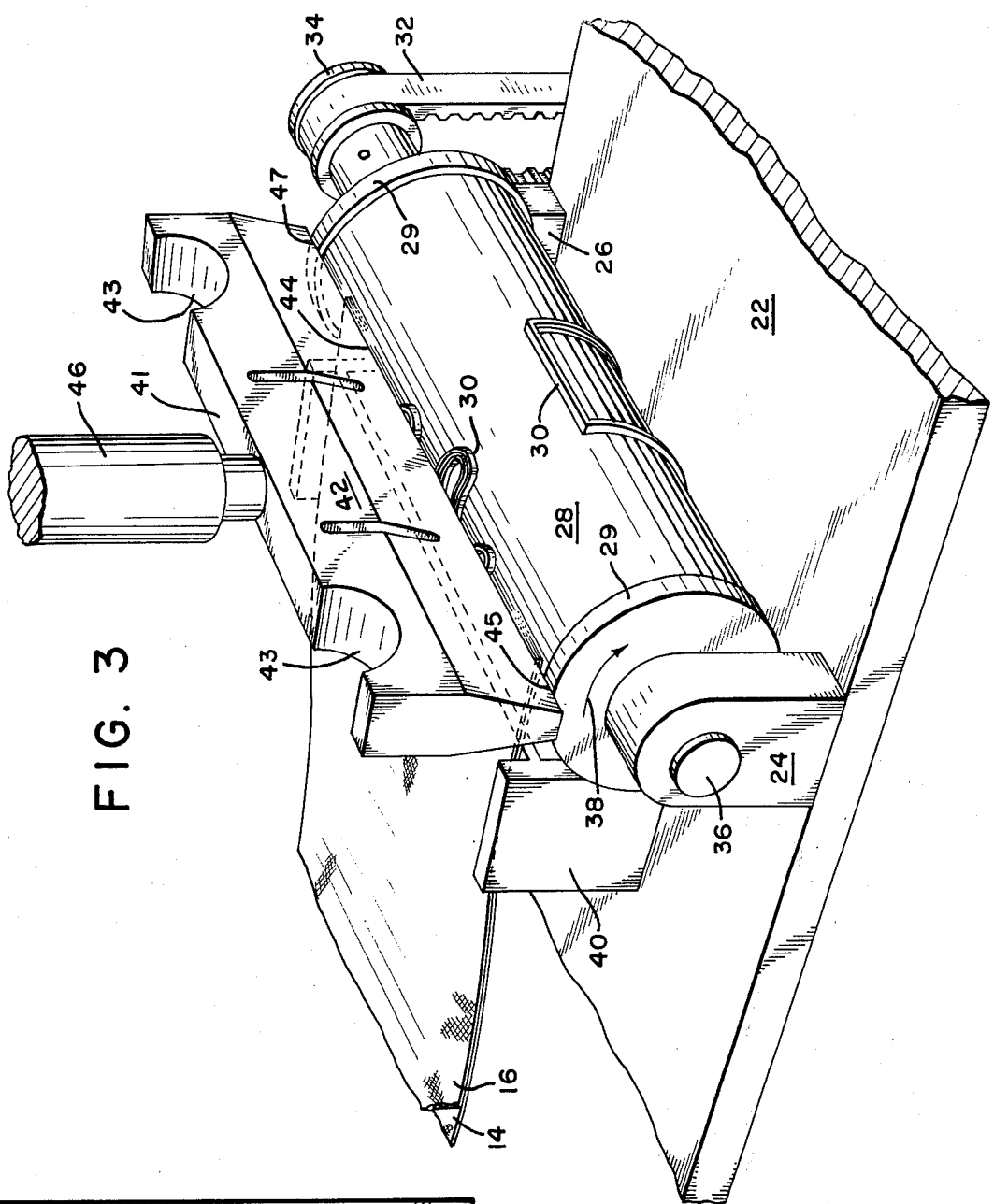
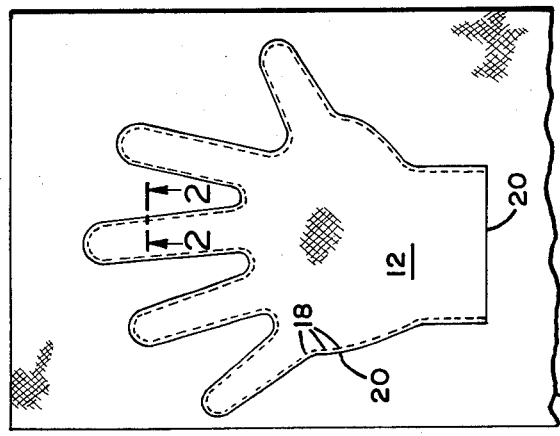
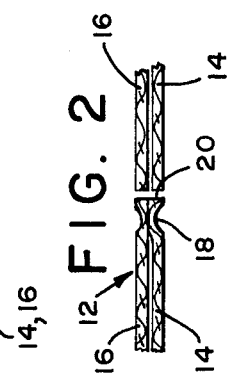

MAXIMUM INSTANTANEOUS DISPLACEMEMT OF FRONTAL SURFACE VS. LOCATION ALONG FRONTAL SURFACE

ULTRASONIC WELDING AND CUTTING APPARATUS

BACKGROUND OF THE INVENTION

This invention refers to an apparatus for simultaneously welding and cutting soft film and fabric material by ultrasonic energy. Welding and cutting of thermoplastic fabric material by ultrasonics has been shown for instance in U.S. Pat. No. 3,378,429 dated Apr. 16, 1968 entitled "Method and Apparatus for Treating Material with Sonic Energy" issued to E. B. Obeda, in Japanese Pat. No. 250,121 dated Mar. 6, 1959, or in the article "Ultraschallverfahren zum Verbinden und Trennen von Kunststoffen", by E. A. and R. E. Nier, published in Zeitschrift fur Schweisstechnik dated January 1965, pages 12 through 19.

In these arrangements a horn, resonating at an ultrasonic frequency, is brought into forced contact with one side of sheet material made entirely or partially of thermoplastic material, while the other side of the material is supported on an anvil surface. The transfer of vibratory energy from the horn to the material provides a weld and a suitably shaped cutting surface of the horn, upon impact on the material and anvil surface causes a cut in the sheet material. In this manner, as has been shown in the art referenced, it is possible to simultaneously weld and cut thermoplastic material while providing a finished edge at the cut.

Several problems, however, are manifest with an arrangement of this type. Most significantly, the high frequency repetitive impact of the knife edge of the horn upon the anvil surface causes a rapid wear of the cutting surface and already after a few hours of operation, either the knife edge of the horn or the anvil surface must be reworked. This condition is quite apparent considering that in an ultrasonic apparatus the repetitive impact of the horn surface upon the anvil occurs at a frequency of 16 kHz or higher, and that the force of impact is several thousand g. Also the contact between the horn frontal surface and the anvil results in audible chatter.

There exists a need for fabricating various articles from thermoplastic material or textile material having thermoplastic constituents by the use of ultrasonic energy as is shown, for instance, in the U.S. Pat. No. 3,562,041 dated Feb. 9, 1971 "Method and Apparatus for the Ultrasonic Joining of Materials According to a Pattern" issued to C. A. Robertson, which patent reveals the manufacture of shirt sleeve cuffs. Two sheetlike elements are fed underneath an ultrasonically vibrated horn while being supported on a contoured anvil which is provided with the raised outline of a cuff or some other desired pattern. After the sealed material portion leaves the welding station, a separate cutting device is used to sever the sealed or welded material portion from the surrounding web. Sealing or welding of thermoplastic sheet material is shown also in U.S. Pat. No. 3,733,238 dated May 15, 1973 "Apparatus for Vibration Welding of Sheet Material" issued to D. D. Long et al., without that any cutting or severing means are used.

SUMMARY OF THE INVENTION

The present invention concerns an improved ultrasonic apparatus for simultaneously sealing and cutting of textile material and providing that the welded portion of the textile material is immediately severed from the surrounding web. Hence, the need for a separate cutting operation or cutting station is obviated. In copending application for U.S. patent application Ser. No. 377,399 filed July 9, 1973 in the name of E. Backhurst, entitled "Ultrasonic Welding and Cutting Apparatus", which application is assigned to the assignee of this application, the anvil means used for sealing and cutting is constructed to include bearing surface means of sufficient width to absorb and distribute the impact of the vibrating horn, thereby minimizing the wear of the impacting surfaces, i.e. anvil and horn surfaces. In addition, the cutting surface forms a part of the anvil structure and is in juxtapostion with the welding surface also disposed on the anvil. The bearing surface means and the cutting surface, both forming a part of the anvil construction, are of substantially equal height to provide for the use of a horn having a straight frontal surface thereby eliminating special contours on the horn frontal surface as is required in some of the prior art devices. However, the lateral edge regions of the horn contacting the bearing surface means of the anvil give rise to audible chatter and the heretofore troublesome wear problem, while greatly reduced in magnitude, still remains, although to a lesser extent.

The present invention discloses an improved arrangement for cutting and sealing thermoplastic fabric material using a bar horn which exhibits a non-uniform motional amplitude along its frontal surface. More specifically, the horn is provided with means for causing the lateral edge portions which contact the bearing surfaces of the anvil to have only minimal motional amplitude while the larger center portion of the frontal surface of the horn undergoes its normal motional amplitude for providing the sealing and cutting action.

By means of the constructional features indicated hereinabove and to be described hereafter, a greatly simplified ultrasonic sealing and cutting apparatus has been devised which most significantly exhibits simplicity, durability and long life. Moreover, the apparatus provides for ease and economic manufacture of various textile articles, such as shirt sleeve cuffs, gloves and the like, using two superposed sheet materials sealed at the edge and severed from the surrounding web material. Other significant improvements achieved by the present construction will be more clearly apparent by reference to the following description when taken in conjunction with the accompanying drawings.

BRIEF DESCRIPTION OF THE DRAWINGS

FIG. 1 is a plan view of a typical article to be manufactured by the present apparatus;

FIG. 2 is a sectional view along lines 2—2 in FIG. 1;

FIG. 3 is a perspective view of the major elements forming the instant invention;

DETAILED DESCRIPTION OF THE INVENTION

Referring now to the figures and FIGS. 1 through 4 in particular, there is shown in FIG. 1 the outline of a glove 12 which is to be manufactured by the use of two superposed fabric materials 14 and 16 which preferably are in web form. In order to fabricate this article, the superposed materials 14 and 16 are ultrasonically sealed to each other along the dashed line 18 and cut along the solid line 20. By virtue of the cut edge 20 the glove 12 is then separated from the surrounding web material.

FIG. 2 shows in greater detail the sealed or welded area 18 and the cut edge 20 in juxtaposition so as to provide a finished edge which is not subject to loose threads or ravelling. It will be apparent that other articles such as shirt collars, shirt cuffs, chemical filter pads and the like can be manufactured in a similar manner, in each instance the welded or sealed areas conforming to the outline of the respective article.

Figure 4:
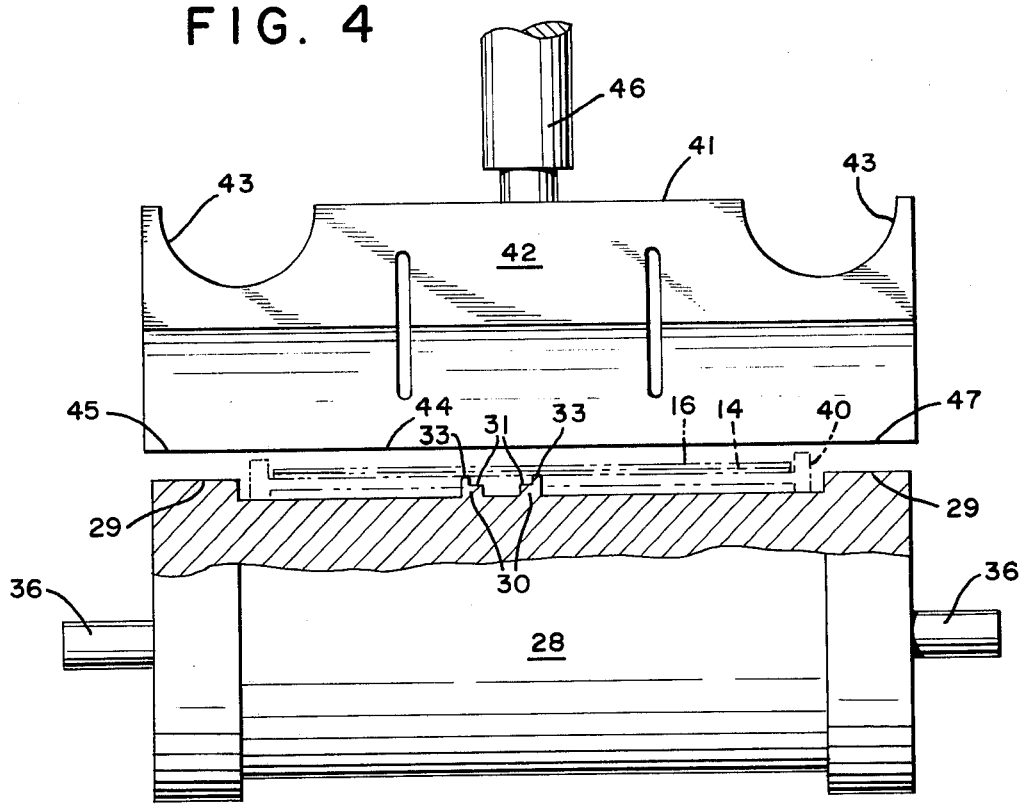
FIG. 4 is a sectional view illustrating certain features of the invention.

Referring now to FIGS. 3 and 4 there is shown an apparatus for manufacturing the article 12. A base plate 22 supports a pair of bearing supports 24, 26 which journal an anvil structure in the form of a roller 28. The roller 28 is provided with a raised pattern of welding and cutting surface means 30 which conform, in this instance, to the outline of the glove 12 shown in FIG. 1. A belt 32 via a pulley 34 attached to the shaft 36 of the roller 28 is adapted to rotate the roller 28 in the direction indicated by the arrow 38. A guide 40 serves for guiding the superposed flat fabric materials 14, 16 toward the anvil roller 28 and into the gap between the roller 28 and the horn 42 so that the underside of the fabric material is in contact with raised pattern 30 of the anvil roller 28 and the upper side of the fabric material is adapted to be contacted by the frontal surface 44 of the horn. The bar horn 42 is coupled with its input surface 41 to an electroacoustic converter unit 46 for causing the horn to be driven at its resonant frequency in which case the frontal surface 44 is located at an antinodal region of longitudinal motion. In this manner, the frontal surface 44 of the horn undergoes high frequency vibration, for instance, 20 kHz with a motional amplitude of 0.001 to 0.003 inches peak to peak in the direction toward and away from the anvil surface. The horn preferably is constructed in accordance with the teachings in U.S. Pat. No. 3,113,225 issued to C. Kleesattel et al., entitled "Ultrasonic Vibration Generator" dated Dec. 3, 1963, and the converter unit 46 may be constructed in accordance with U.S. Pat. No. 3,328,610 issued to S. E. Jacke et al., entitled "Sonic Wave Generator" dated June 27, 1967.

A salient feature of this invention is the provision of a horn which is characterized by a uniform motional amplitude at the sealing and cutting surface and by a reduced motional amplitude at the lateral regions 45 and 47 which repetitively impact upon the bearing surfaces 29 of the anvil roller. The reduced motional amplitude provides for a quieter operation due to the absence of audible chatter. Moreover, the absence of the high motional impact lengthens the life of the horn's frontal surface, a most important feature of the present invention.

Figure 5:
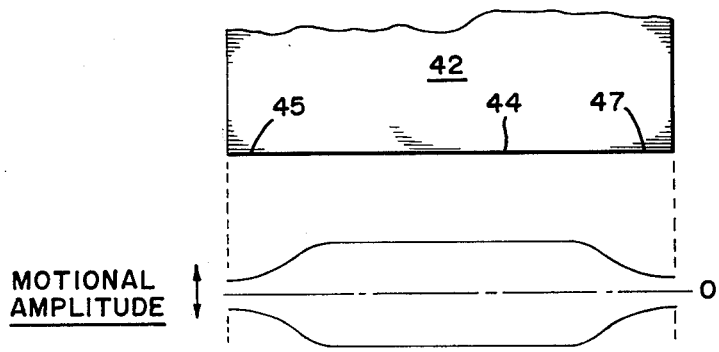
FIG. 5 is a sketch illustrating schematically a principal feature of the invention.

The differential vibratory motion along the output or frontal surface of the horn is achieved in a preferred embodiment of the present invention by providing two spaced notches 43 at the input surface of the horn, one notch on each side of the converter unit 46. The resulting motional characteristics exhibited by the horn along its lineal output surface is shown in FIG. 5 from which it will be evident that the motional excursion (peak-to-peak) is markedly reduced at the lateral regions 45 and 47. The notches are generally aligned with the regions of reduced vibrational amplitude.

A typical horn made of titanium and designed for operation at 20 kHz exhibits an input surface 10 inches (25.4 cm) long by 1½ inches (38 mm) wide and is tapered to ¾ inch (19 mm) width at the frontal surface. Each notch 43 is half round with a 1⅜ inch (35 mm) radius and located with its center approximately 1¼ inches (32 mm) from the lateral edge. The reduction of motional amplitude at the edge portion of the output surface is significant and the amplitude is only 20 to 30 percent of the motional amplitude present in the center portion.

The specific operation of the present invention will be more clearly apparent by the reference to FIG. 4. The raised pattern 30 on the anvil structure, in this instance the roller, and formed in the outline of the article 12 comprises a first raised surface 31 which serves as the welding surface and a juxtaposed second raised surface 33 which acts as the cutting surface when impacted by the frontal surface 44 of the horn. The frontal surface 44 of the horn is a straight line surface to provide lineal and sequential contact with the different portions of the pattern. The ridge of the cutting surface 33 by virtue of the desired result is relatively narrow and typically from 0.005 to 0.020 inches (0.13 mm to 0.5 mm) wide. The repetitive high frequency impact accompanied by the high g forces would cause a relatively quick wear and dulling of the cutting surfaces 33 and/or a grooving of the frontal surface 44 of the horn 42. In order to prevent this occurrence, the anvil roller 28 is provided at a location outside the pattern area and the web of sheet materials with a pair of bearing surfaces 29 which have a ridge width which is a multiple of that of a respective cutting surface 33. The ridge of the bearing surface means 29 is disposed at the same height as that of the cutting surface 33 so that the bearing surfaces 29 act as a stop for the horn and also distribute the impact force, thereby preventing the entire impact forces to be borne by the relatively narrow cutting surfaces. The provision of these bearing surfaces significantly improves the life and durability of the cutting surfaces 33. In a typical example, it has been found advantageous to make the width of the bearing surface means from 25 to 50 times as wide as that of a particular cutting surface. It will be apparent, moreover, that by providing the bearing surface means on the anvil means, the frontal surface of the horn becomes a straight lineal surface which is readily manufactured and which easily can be refinished in the event that any wear or grooving is noticed after extensive use. Despite the provision of the bearing surface means 29, wear of the horn frontal surface 44 and chatter as the horn frontal surface 44 repetitively impacts upon the bearing surfaces 29 are problems. The notches 43 in the horn 42 alter the ultrasonic motion of the horn along the frontal surface 44 in such a manner as to cause reduced impact upon the bearing surfaces, thus minimizing wear and chatter of the horn, but leaving the sealing and cutting areas which require relatively large motional amplitude substantially unaffected.

It should be noted here that in the event of a glove, the raised pattern omits a sealing surface at the opening where the hand enters the glove, see FIG. 1.

The bearing surface means, instead of forming an integral part of the anvil means, may comprise quite obviously removable metal elements to provide for quick replacement thereof. This modification is especially applicable when the anvil means comprises plates. The bearing surface means advantageously are held in place by pins and screws and if manufactured initially with too great an elevation, a grinding operation may be used to derive the finished dimension.

Figure 6:
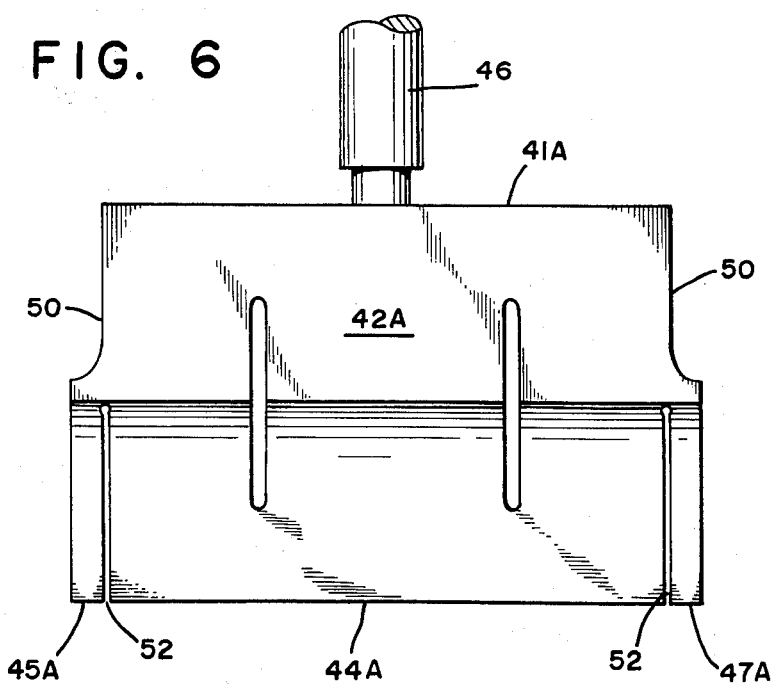
FIG. 6 is an elevational view of another embodiment of the invention.

In FIG. 6 an alternative embodiment of the invention is shown wherein the rear portion of the horn 42A is provided with a cutout section 50 extending substantially a quarter wavelength from the input surface 41A. The cutout section is designed to have approximately the same width as the bearing surface means 29, corresponding to the portions along the frontal surface of the horn 45A and 47A whereat the reduced vibration amplitude is desired. The reduced vibration amplitude permits accurate gauging between the horn and anvil for the particular workpieces to be welded. In addition, two narrow slots 52 are machined extending from the frontal surface 44A of the horn for a distance substantially one-quarter wavelength toward the input surface, hence terminating substantially in the nodal region of the horn. The slots are aligned with the respective edges of the cutouts 50. While the end of the cutout 50 is preferably rounded as shown, a squared corner cut is useable, but such shape would result in great mechanical stress at the corner.

The principle of this embodiment is that at each side of the horn a stub is formed which presents a high impedance to the converter at the frequency of operation, i.e. where the stub has a length equal to one-quarter wavelength at the resonant frequency. Thus, the horn exhibits reduced displacement amplitude at the output surfaces 45A and 47A. Tests have shown that in the case of a 8½ inch (21.6 cm) wide horn, the displacement amplitude at the end regions 45A and 47A was only four percent of the center region displacement amplitude.

Figure 7:
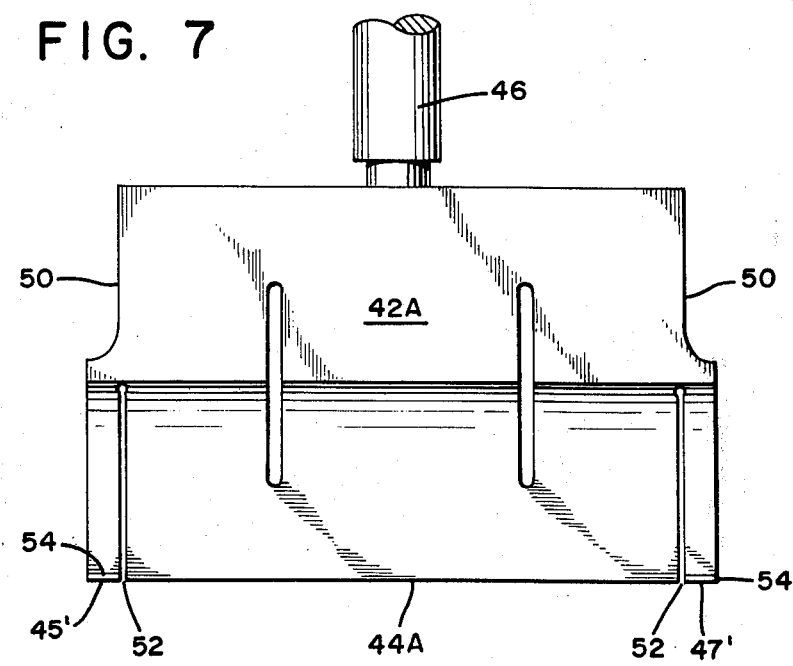
FIG. 7 is an elevational view of a modified embodiment of the invention.

In FIG. 7, wear resistant pads 54 are disposed at the frontal surfaces 45' and 47' of the respective stubs. The wear resistant pads 54, made of hard material, reduce the wear at the edge regions of the horn frontal surface and allow longer operation of the apparatus between stoppages for reworking of the horn frontal surface or the anvil cutting surfaces. In one embodiment, the wear resistant pads are made of tungsten carbide material brazed upon the frontal surface of the stubs. Other hard metal material may be used for the pads 54.

One result of using stubs as described hereinabove is that flexural mode vibrations are generated in the stubs in a direction perpendicular to the direction of the longitudinal ultrasonic vibratory motion. The frequency of the flexural vibrations is sufficiently low, therefore having a long wavelength, so that the flexural vibrations are not coupled to and through the remainder of the horn 42.

Figure 8:
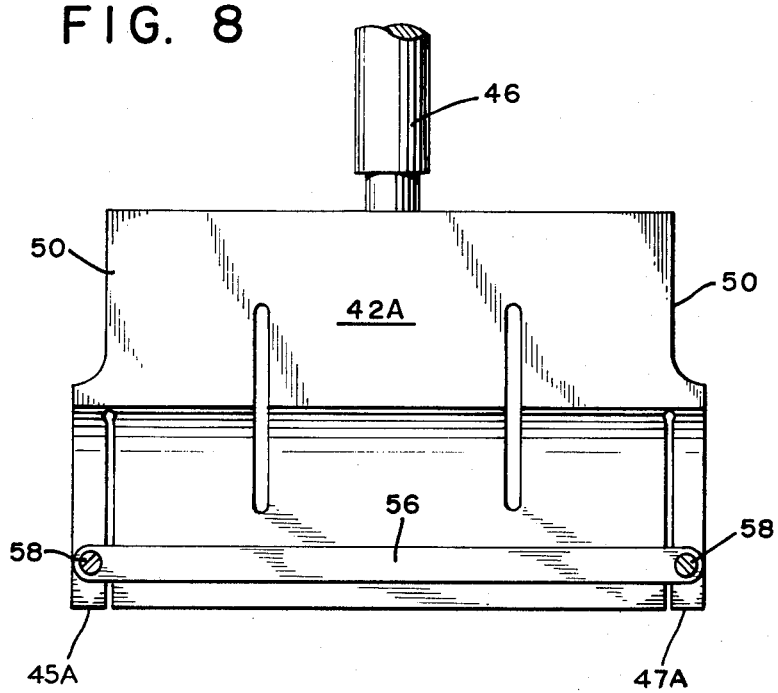
FIG. 8 is an elevational view of a further embodiment of the invention.
Figure 9:
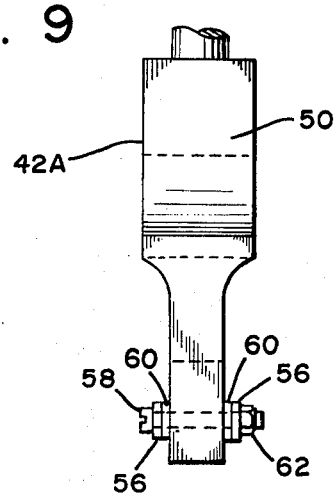
FIG. 9 is a side view of the embodiment shown in FIG. 8.

FIG. 8 illustrates a preferred solution for reducing the flexural vibrations. A damping means in the form of a cross bar 56 disposed on both sides of the horn 42 is coupled to each stub by means of a screw 58, spacer 60 and nut 62 as illustrated in FIG. 9. Each cross bar 56 must be sufficiently rigid to substantially inhibit the induced flexural vibrations in the stubs.

In applications where the spacing between the frontal surface 44A and the anvil surfaces 31 and 33 is critical, the nonvibrating horn edges 45A and 47A are used for accurately gauging the distance between the frontal surface of the horn and the anvil.

It will be seen that the foregoing invention provides an apparatus which is adapted to simultaneously weld and cut fabric material in any desired pattern and that by virtue of the notches, cutouts and slots in the horn, and of the bearing surfaces provided on the anvil means, the cutting surfaces and the horn's frontal surface are protected from rapid deterioration and wear and the audible chatter is greatly diminished.

What is claimed is:

1. In an ultrasonic welding and cutting apparatus for welding and cutting soft film and fabric material, the combination of:

horn means adapted to be resonant at a predetermined frequency having an input surface for receiving vibratory energy of said frequency and an opposite frontal surface for transferring the received energy to material in contact with said frontal surface;

electroacoustic means coupled to said horn means at its input surface for rendering said horn means resonant;

anvil means disposed opposite said frontal surface for supporting the material for contact with said frontal surface to provide for energy transfer from said horn means to the material, said anvil means including a pattern of raised welding and cutting surfaces in the shape of an article to be produced, and raised bearing surface means for impact by said frontal surface, and said horn being constructed to exhibit substantially uniform motional excursion of said frontal surface in the direction toward said anvil at the region opposite said pattern of welding and cutting surfaces and including means for producing reduced motional excursion of said frontal surface at the region of impact with said bearing surface means.

2. In an ultrasonic welding and cutting apparatus for welding and cutting soft film and fabric material as set forth in claim 1, said horn means being a bar horn having a lineal frontal surface, and said means for producing reduced motional excursion causing reduced motional excursion to occur at the lateral edge portions of said frontal surface.

3. In an ultrasonic welding and cutting apparatus for welding and cutting soft film and fabric material as set forth in claim 2, said means for producing said reduced motional excursion being located at said input surface.

4. In an ultrasonic welding and cutting apparatus for welding and cutting soft film and fabric material as set forth in claim 3, said means located at said input surface comprising a pair of spaced notches.

5. In an ultrasonic welding and cutting apparatus for welding and cutting soft film and fabric material as set forth in claim 4, said notches being of substantially semi-circular shape.

6. In an ultrasonic welding and cutting apparatus for welding and cutting soft film and fabric material as set forth in claim 4, one notch being disposed on either side of said electroacoustic means coupled to a central portion of said input surface.

7. In an ultrasonic welding and cutting apparatus for welding and cutting soft film and fabric material as set forth in claim 2, said means for producing said reduced motional excursion being located at said input surface and said frontal surface.

8. In an ultrasonic welding and cutting apparatus for welding and cutting soft film and fabric material as set forth in claim 7, said means for producing non-uniform motional excursion comprising respectively a pair of cutouts extending from said input surface for substantially an odd number of quarter wavelengths of the sound energy traveling through said horn from said input surface toward said frontal surface and a pair of slots for causing a pair of respective stubs extending from said frontal surface for substantially an odd number of quarter wavelengths toward said input surface, said slots being in alignment with said cutouts.

9. In an ultrasonic welding and cutting apparatus for welding and cutting soft film and fabric material as set forth in claim 7, said means for producing reduced motional excursion comprising respectively a pair of cutouts extending from said input surface for substantially one-quarter wavelength of the sound energy traveling through said horn from said input surface toward said frontal surface and a pair of slots for causing a pair of respective stubs extending from said frontal surface for substantially one-quarter wavelength toward said input surface, said slots being in alignment with said cutouts.

10. In an ultrasonic welding and cutting apparatus for welding and cutting soft film and fabric material as set forth in claim 9, and including vibration damping means coupled to said stubs.

11. In an ultrasonic welding and cutting apparatus for welding and cutting soft film and fabric material as set forth in claim 10, said vibration damping means comprising a cross bar fastened at each end to a respective stub.

12. A bar horn having an input surface and a lineal frontal surface, and adapted to be rendered resonant as a half wavelength resonator when driven at its input surface with vibratory energy of predetermined frequency, the improvement comprising: a plurality of apertures provided in said horn for causing, responsive to said horn being rendered resonant, a first portion of said lineal frontal surface to exhibit substantially uniform motional excursion and a second portion of said lineal frontal surface to exhibit reduced motional amplitude than that exhibited by said first portion.

13. A bar horn as set forth in claim 12, said plurality of apertures provided in said horn including notch means at said input surface.

14. A bar horn as set forth in claim 13, said horn being dimensioned to be resonant at a frequency of at least 16 kHz.

15. A bar horn as set forth in claim 12, said plurality of apertures comprising a pair of cutouts extending from said input surface for substantially an odd number of quarter wavelenghts of the sound energy traveling through said horn from said input surface toward said frontal surface and a pair of slots for causing a pair of respective stubs extending from said frontal surface for substantially an odd number of quarter wavelengths toward said input surface, said slots being in alignment with said cutouts.

16. A bar horn as set forth in claim 12, said first portion being centrally disposed along said lineal frontal surface and said second portion being the lateral edges of said lineal frontal surface.

17. A bar horn as set forth in claim 16, said plurality of apertures provided in said horn comprising a pair of cutouts at said input surface and a pair of slots at said frontal surface for forming respective stubs between each of said slots and the respective lateral edge of said horn.

18. A bar horn as set forth in claim 17, and further including vibration damping means coupled to said stubs.

* * * * *